US011345061B2

(12) United States Patent
Escowitz et al.

(10) Patent No.: US 11,345,061 B2
(45) Date of Patent: May 31, 2022

(54) METHOD AND SYSTEM FOR BATCH PREFORMING OF FIBER BUNDLES

(71) Applicant: Arris Composites Inc., Berkeley, CA (US)

(72) Inventors: Ethan Escowitz, Berkeley, CA (US); J. Scott Perkins, Oakland, CA (US); Erick Davidson, Piedmont, CA (US); Riley Reese, Carpinteria, CA (US); Cory Bloome, San Francisco, CA (US)

(73) Assignee: Arris Composites Inc., Berkeley, CA (US)

( * ) Notice: Subject to any disclaimer, the term of this patent is extended or adjusted under 35 U.S.C. 154(b) by 0 days.

(21) Appl. No.: 16/857,710

(22) Filed: Apr. 24, 2020

(65) Prior Publication Data

US 2020/0338788 A1    Oct. 29, 2020

Related U.S. Application Data

(60) Provisional application No. 62/838,192, filed on Apr. 24, 2019.

(51) Int. Cl.
*B29B 11/16* (2006.01)
*B29B 11/12* (2006.01)
*B29K 105/06* (2006.01)

(52) U.S. Cl.
CPC .............. *B29B 11/16* (2013.01); *B29B 11/12* (2013.01); *B29K 2105/06* (2013.01)

(58) Field of Classification Search
CPC ....... B29B 11/16; B29B 11/12; B29C 70/541; B29C 70/543; B29C 70/30; B29C 33/12; B29C 33/42; B29C 53/083; B29K 2105/06
See application file for complete search history.

(56) References Cited

U.S. PATENT DOCUMENTS

| 9,718,233 B2 | 8/2017 | Karb et al. |
| 2013/0243989 A1 | 9/2013 | Ridges et al. |
| 2016/0271839 A1 | 9/2016 | Roche et al. |
| 2020/0114596 A1 | 4/2020 | Davidson et al. |

OTHER PUBLICATIONS

Authorized Officer Monica Lozza, International Search Report issued in PCT Patent Application No. PCT/US2020/029826 dated Aug. 10, 2020.

*Primary Examiner* — Monica A Huson
(74) *Attorney, Agent, or Firm* — Kaplan Breyer Schwarz, LLP (57) ABSTRACT

A preformer capable of simultaneously forming plural preforms includes a forming surface and source of heat. The forming surface includes guides to keep fiber bundles, the nascent form of the preforms, spaced apart and to maintain their cross-sectional dimension. In some embodiments, the preformer further includes a source of energy, and in some embodiments, the preformer includes a source of energy and a cooling source. A method for forming preforms is also disclosed.

27 Claims, 8 Drawing Sheets

METHOD AND SYSTEM FOR BATCH PREFORMING OF FIBER BUNDLES

STATEMENT OF RELATED CASES

This specification claims priority to U.S. Pat. Application Ser. No. 62/838,192, filed on Apr. 24, 2019, and which is incorporated by reference herein.

FIELD OF THE INVENTION

The present invention relates to fiber-composite materials.

BACKGROUND

Fiber composites include two primary components: a matrix material and a fibrous material. The fibrous material—fibers—are typically responsible for the strength of the composite, in addition to any other properties they contribute to the composite. The matrix, formed from a polymer resin, surrounds and supports the fibers, maintaining their relative positions and preventing abrasion and environmental attack thereof. The combination of the fibers and resin is synergistic, and the resulting properties thereof are to some extent unpredictable. That is, the composite may possess material properties unavailable from the individual constituents.

The alignment of fibers within composites along directions of principal stress is an important consideration in deriving the maximum performance for a composite part. Such alignment is performed, for example, using hand-layup techniques by which the fibers are placed in a mold, etc. In some such embodiments, segments of fiber bundles, which include thousands of fibers, are cut and/or pre-shaped using a bending machine into a desired form, creating "preforms", which are then positioned in a mold.

SUMMARY

The present invention provides a way to decrease production cycle times for the manufacture of high-volume composite parts, thereby increasing their production rate.

In existing molding processes, preforms are fabricated one at a time until a desired number of them have been produced. This is a time-consuming process. In accordance with the present teachings, systems and methods are disclosed whereby many instances of a particular "preform" shape are formed simultaneously using a single tool. Every cycle of the method produces a batch of such identical preforms. This facilitates high-volume manufacturing of composite parts.

In accordance with the present teachings, a forming tool, the surface of which has a specified contour, is used to simultaneously create plural, essentially identical preforms. Under the application of force and at sufficient temperature, the fiber bundles are forced against the surface of the tool and adopt the contour thereof.

The tows or fiber bundles used in the method are impregnated with resin. In accordance with the method, the temperature of the fiber bundles—more particularly, the temperature of the resin—is raised to a temperature that is at least a few degrees above the heat deflection temperature of the resin. It is important that the temperature does not approach the actual melting point of the resin. That is, the temperature should not exceed the Vicat point, which is the point at which the resin loses its stability form (loses its load-bearing capacity).

When this occurs, the fiber bundles are formable and readily deflect with an appropriate amount of applied force. To the extent that portions of the undeflected fiber bundles do not abut the forming tool, the process ultimately forces such portions against the forming tool to acquire the shape of the surface thereof. The shaped fiber bundles are then cooled to a temperature that is below the heat deflection temperature, which fixes their shape, thereby creating a plurality of substantially identical "preforms."

Typical thermoplastic forming processes use complementary male and female tools. In some embodiments of the present invention, a single forming surface is used to create the preforms. This decreases costs and cycle times, as less material needs to be fabricated and less thermal mass is involved in temperature cycling.

Testing has shown that a variety of factors can affect the outcome of the forming process. For example, it has been found that the tendency for a preform to deform at bend site is a function of (a) the resin in the fiber bundles, (b) the mode of heating, and (c) the mode of applying force, among other factors. Furthermore, testing has revealed that it is important to constrain the preform at the point of bending to deformation at that site. In some embodiments, this is accomplished via channels in the forming tool, one such channel for each preform being bent.

In some embodiments, the invention provides a method for simultaneously forming a plurality of preforms, including the operations of:

positioning a plurality of resin-impregnated fiber bundles on a surface of a forming tool, each fiber bundle having a length, wherein a first portion of the length, but not a second portion of the length of each fiber bundle is in contact with the surface of the forming tool, and wherein the first portion of each fiber bundle is physically separated from neighboring fiber bundles;

restraining lateral movement of each first portion towards neighboring first portions; and deforming the plurality of fiber bundles wherein the second portion of each fiber bundle contacts the surface of forming tool, conforming to a contour of the surface of the forming tool, thereby forming a plurality of preforms.

In some other embodiments, the invention provides a method for simultaneously forming a plurality of preforms, including the operations of:

positioning a plurality of resin-impregnated fiber bundles on a surface of a forming tool, wherein each fiber bundle is physically separated from neighboring fiber bundles;

restraining lateral movement of each fiber bundle towards neighboring fiber bundles;

deforming the plurality of fiber bundles in accordance with a surface geometry of the forming tool, deformation being due, at least in part, to raising a temperature of the fiber bundles above a heat deflection temperature of the resin and below the melting temperature of the resin; and cooling the deformed fiber bundles, thereby forming a plurality of preforms.

In some additional embodiments, the invention provides a system for simultaneously forming a plurality of preforms, the system including:

a forming tool, the forming tool having a surface that receives a plurality of fiber bundles, the surface of the forming tool having a plurality of spaced-apart guides for maintaining the fiber bundles in lateral spaced relation to one another and for maintaining a cross-sectional dimension of each of the fiber bundles; and a source of energy, wherein the source of energy is configured to apply energy directly to at least one of the forming tool and the plural fiber bundles, the energy ultimately causing, at least in part, the plurality of fiber bundles to deform consistent with a contour of the surface of the forming tool.

Additional embodiments of the invention comprise any other non-conflicting combination of features disclosed in the above-disclosed embodiments, the appended Drawings, and in the Detailed Description below.

DETAILED DESCRIPTION

The following terms, and their inflected forms, are defined for use in this disclosure and the appended claims as follows:

"Fiber" means an individual strand of material. A fiber has a length that is much greater than its diameter. For use herein, fibers are classified as (i) continuous or (ii) short. Continuous fibers have a length that is about equal to the length of a major feature of a mold in which they are placed. And, similarly, continuous fibers have a length that is about equal to that of the part in which they will reside. Short fibers have a length that is shorter than the length of a major feature of the mold in which they are placed, and typically comparable to the length of minor features of the mold, plus some additional length to enable "overlap" with other fibers, such as continuous fibers. The term "short fiber," as used herein, is distinct from the "chopped fiber" or "cut fiber," as those terms are typically used in the art. In the context of the present disclosure, short fiber is present in a preform and, as such, will have a defined orientation in the preform, the mold, and the final part. As used generally in the art, chopped or cut fiber has a random orientation in a mold and the final part. Additionally, as used herein, the length of "short fiber" will be based on the length of the smaller features of a mold (they will be comparable in length). In contrast, the length of chopped or cut fiber typically bears no predefined relationship to the length of any feature of a mold/part.

"Compatible" means, when used to refer to two different resin materials, that the two resins will mix and bond with one another.

"Stiffness" means resistance to bending, as measured by Young's modulus.

"Tensile strength" means the maximum stress that a material can withstand while it is being stretched/pulled before "necking" or otherwise failing (in the case of brittle materials).

"Continuous" fiber or fiber bundles means fibers/bundles having a length that is about equal to the length of a major feature of a mold in which the fiber/bundles are placed.

"Tow" means a bundle of fibers, and those terms are used interchangeably herein unless otherwise specified. Tows are typically available with fibers numbering in the thousands: a 1K tow, 4K tow, 8K tow, etc.

"Prepreg" means fibers, in any form (e.g., tow, woven fabric, tape, etc.), which are impregnated with resin.

"Towpreg" or "Prepreg Tow" means a fiber bundle (i.e., a tow) that is impregnated with resin.

"Preform" means a sized, or sized and shaped portion of tow-preg, wherein the cross section of the fiber bundle has an aspect ratio (width:thickness) of between about 0.25 to about 6. The term "preform" explicitly excludes sized/shaped: (i) tape (which typically has an aspect ratio—cross section, as above—of between about 10 to about 30), (ii) sheets of fiber, and (iii) laminates.

"Planar" means having a two-dimensional characteristic. The term "planar" is explicitly intended to include a curved planar surface.

"About" or "Substantially" means +/−20% with respect to a stated figure or nominal value.

Other than in the examples, or where otherwise indicated, all numbers expressing, for example, quantities of ingredients used in the specification and in the claims are to be understood as being modified in all instances by the term "about." Accordingly, unless indicated to the contrary, the numerical parameters set forth in the following specification and attached claims are understood to be approximations that may vary depending upon the desired properties to be obtained in ways that will be understood by those skilled in the art. Generally, this means a variation of at least +/−20%.

Also, it should be understood that any numerical range recited herein is intended to include all sub-ranges encompassed therein. For example, a range of "1 to 10" is intended to include all sub-ranges between (and including) the recited minimum value of about 1 and the recited maximum value of about 10, that is, having a minimum value equal to or greater than about 1 and a maximum value of equal to or less than about 10.

All publications (patent related or otherwise) mentioned in this disclosure are incorporated by reference herein.

Embodiments of the invention provide systems and methods for creating multiple instances of a preform, each instance being substantially identical to all others, at least in terms of size and shape. In the context of the present invention, a preform is a sized, or sized and shaped segment of a resin-impregnated fiber bundle. The fiber bundle—known as "tow"—is available in very long lengths, and typically includes multiples of 1000 fibers (e.g., 1K, 10K, 24K, etc.). In some embodiments, the tow is pre-impregnated with polymer resin (i.e., towpreg). In some other embodiments, resin is added on-site to tow, such as via a pultrusion process. This process, as performed by a pultruder, is well known in the art (wikipedia.org/wiki/Pultrusion). The feed to a pultruder is, for example, pelletized resin and raw fiber (usually provided on spools).

Preforms can have any cross-sectional shape typical for fiber tow (e.g., circular, oval, trilobal, polygonal, etc.). As suits a particular layup (based on mold configuration or other considerations), the preforms can be manipulated to have any form factor (i.e., the sized fiber bundle can be arranged in any fashion to form any shape).

Once created, the preforms are either (1) placed in a mold, or (2) combined with other preforms to form an assemblage thereof—a preform charge—and then placed in mold. The manufacture and use of preform charges are disclosed in U.S. Published Pat. Application 2020/0114596 A1.

Once in the mold, the preforms/preform charge(s) are molded into a fiber-composite part. Preferably, but not necessarily, molding proceeds with the application of heat and pressure in accordance with compression-molding protocols, well known in the art. Conventionally, the resin determines the heating requirement, and the shape and size of the tool determine the pressure requirement. Changing heat and pressure parameters enables a wide range of materials to be molded into components of a desirable shape. Under the applied heat and pressure, the preforms/preform charge(s) are melted and consolidated (i.e., void space removed), and conform to the shape of the mold. After cooling, a fiber-composite part results.

Non-limiting examples of the type of fiber suitable for use in conjunction with embodiments of the invention include: carbon, glass, natural fibers, aramid, boron, metal, ceramic, carbon nanotubes, flax, and others. Non-limiting examples of metal fibers include steel, titanium, tungsten, aluminum, gold, silver, alloys of any of the foregoing, and shape-memory alloys. "Ceramic" refers to all inorganic and non-metallic materials. Non-limiting examples of ceramic fiber include glass (e.g., S-glass, E-glass, AR-glass, etc.), quartz, metal oxide (e.g., alumina), alumina silicate, calcium silicate, rock wool, boron nitride, silicon carbide, and combinations of any of the foregoing. Furthermore, carbon nanotubes can be used.

The individual fibers can have any diameter, which is typically, but not necessarily, in a range of 1 to 100 microns. Each individual fiber can be formed of a single material or multiple materials. Additionally, an individual fiber can comprise a core (of a first material) that is coated with a second material to impart certain characteristics, such as an electrically conductive material, an electrically insulating material, a thermally conductive material, or a thermally insulating material. Moreover, individual fibers can include an exterior coating such as, without limitation, sizing, to facilitate processing, adhesion of binder, or minimize self-adhesion of fibers.

In some embodiments, a preform includes more than one type of fiber. In some embodiments, within a given group of preforms, the fiber composition of the preforms differ.

The resin is typically a thermoplastic polymer. Exemplary thermoplastic resins useful in conjunction with embodiments of the invention include, without limitation, acrylonitrile butadiene styrene (ABS), nylon, polyaryletherketones (PAEK), polybutylene terephthalate (PBT), polycarbonates (PC), and polycarbonate-ABS (PC-ABS), polyetheretherketone (PEEK), polyetherimide (PEI), polyether sulfones (PES), polyethylene (PE), polyethylene terephthalate (PET), polyphenylene sulfide (PPS), polyphenylsulfone (PPSU), polyphosphoric acid (PPA), polypropylene (PP), polysulfone (PSU), polyurethane (PU), polyvinyl chloride (PVC).

Figure 1:
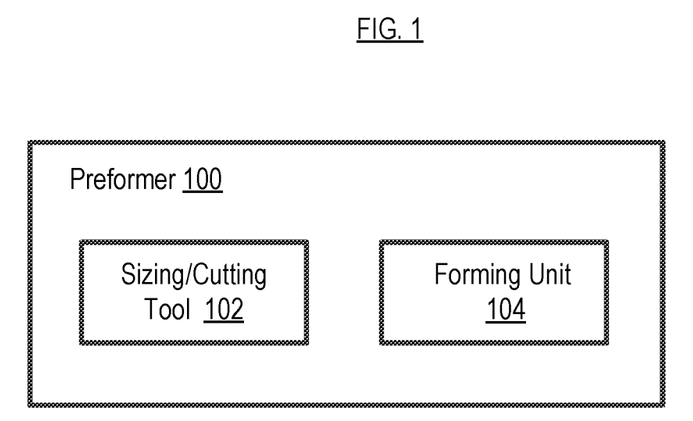
FIG. 1 depicts preformer 100 for batchwise production of preforms in accordance with the present teachings.

Referring now to FIG. 1, resin-infused fiber bundles (hereinafter "towpreg" or "fiber bundles"), however obtained, are fed to preformer 100. In the preformer, the towpreg is sized and cut by sizing/cutting tool 102 to a size appropriate for use in a specific mold or for a specific preform charge. And fiber bundles are bent to an appropriate shape by forming unit 104.

Although shown as being performed by two distinct tools, these operations (i.e., sizing, cutting, and bending) may be performed by a single device, or two or more devices. Furthermore, these operations can be performed in any order, as a function of the design of preformer 100. Thus, in some embodiments, portions of plural uncut runs of towpreg will be simultaneously bent by forming unit 104, and then sized and cut. In some other embodiments, the runs of towpreg are first sized and cut, and then processed by forming unit 104. If the towpreg is cut prior to processing by forming unit 104, then the resulting segments will have to be transferred to the forming unit, such as via a pick-and-place robot.

In accordance with the present teachings, the plural instances (e.g., 5, 10, 20, etc.) of towpreg (i.e., uncut runs or segments) are bent simultaneously. However, depending on the design of preformer 100, the sizing and cutting operations may be performed on a single run of towpreg, simultaneously for a few runs of towpreg (but for fewer runs than the capacity of forming unit 104 for simultaneous processing), or all runs simultaneously.

Figure 2:
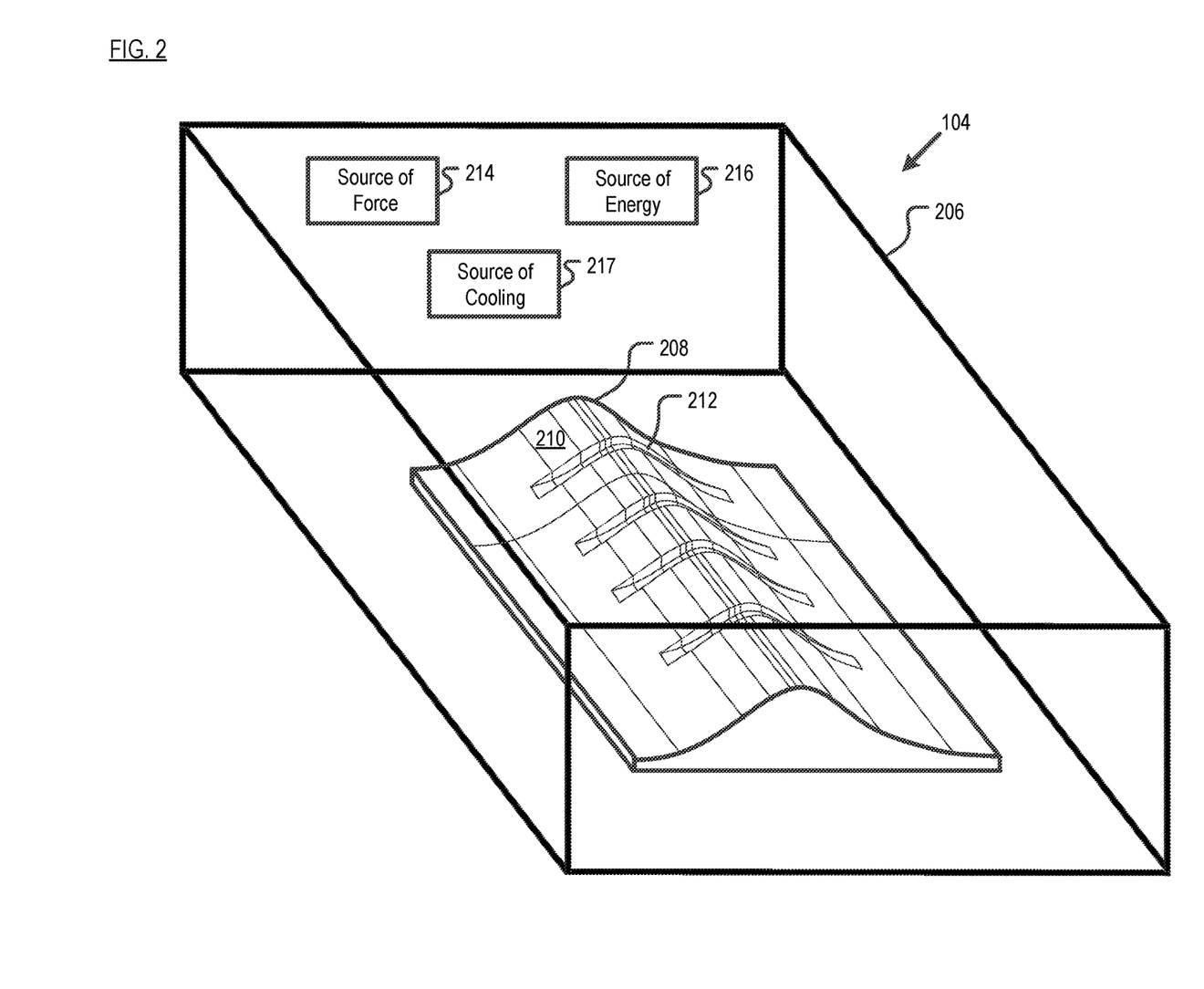
FIG. 2 depicts an embodiment of a forming unit for use in conjunction with the preformer of FIG. 1.

FIG. 2 depicts forming unit 104 for batchwise production of preforms in accordance with the present teachings. The forming unit includes housing 206, forming tool 208, (optional) source of force 214, and source of energy 216. The forming unit also includes, optionally, a source of active cooling 217.

In some embodiments, housing 206 fully encloses the various elements of forming unit 104 to improve the temperature control of various elements of the system, as described further below.

Forming tool 208 dictates the final shape of the preforms. More particularly, fiber bundles reproduce the contour of surface 210 of the forming tool. Forming tool 208 can be made from any material that can be fabricated to a desired surface contour and withstand the processing temperature (i.e., the heat deflection temperature of the resin in the preforms). In the illustrative embodiment, forming tool 208 has a curved surface. In some other embodiments, the surface is planar (flat), wherein deformation of preforms occurs at an edge of the forming tool.

In the illustrative embodiment, forming tool 208 includes a plurality of guides for restraining the plural instances of towpreg that are being processed. In the illustrative embodiment, the guides are embodied as channels 212, which are formed in surface 210 of forming tool 208. There is one channel 212 for each instance of towpreg in a group thereof being simultaneously processed. It is particularly important that the guides are present at or near the location at which the towpreg is actually bending. If not, the towpreg will tend to distort, such as by flattening or contorting excessively and to an unacceptable amount, at the bending location. Channels 212 must be wide enough to receive the towpreg, which means at least as wide as the diameter (or greatest cross-sectional dimension) of the towpreg, and preferably about 10% larger. It is desirable for the towpreg to remain in the channel; consequently, channel depth, at least proximal to any bending regions, should be at least as great as the diameter (or greatest cross-sectional dimension) of the towpreg. In some embodiments, a bar or beam is positioned over across channels 212 near each bend location to further ensure that the towpreg remains in the channels.

In some other embodiments, rather than implementing the guides as channels 212, "fences" formed on and extending away from surface 210 provide the function. The fences can be configured, for example, as two parallel runs of closely spaced pins or, alternatively, as two spaced-apart parallel continuous surfaces.

In some embodiments, forming tool 208 functions as a single surface; that is, it is not used in conjunction with a complementary forming surface, as in compression molding, etc. In some embodiments, forming tool 208 is used in conjunction with a fixture that applies a bending force at select regions of the fiber bundles to conform the plural instances thereof to surface 210 of forming tool 208. And in yet some other embodiments, forming tool 208 is used in conjunction with a complementary forming surface.

As discussed further below, source of force 214 is optional, in the sense that some embodiments it will be required, and in others, gravity will suffice as a deforming force. This is the case for source of cooling 217, as well, wherein passive heat loss can be relied upon in some embodiments. Source of energy 216, which is required, functions to soften the resin in the fiber bundles so that the bundles will deform (and not return to the undeformed state).

Figure 3A:
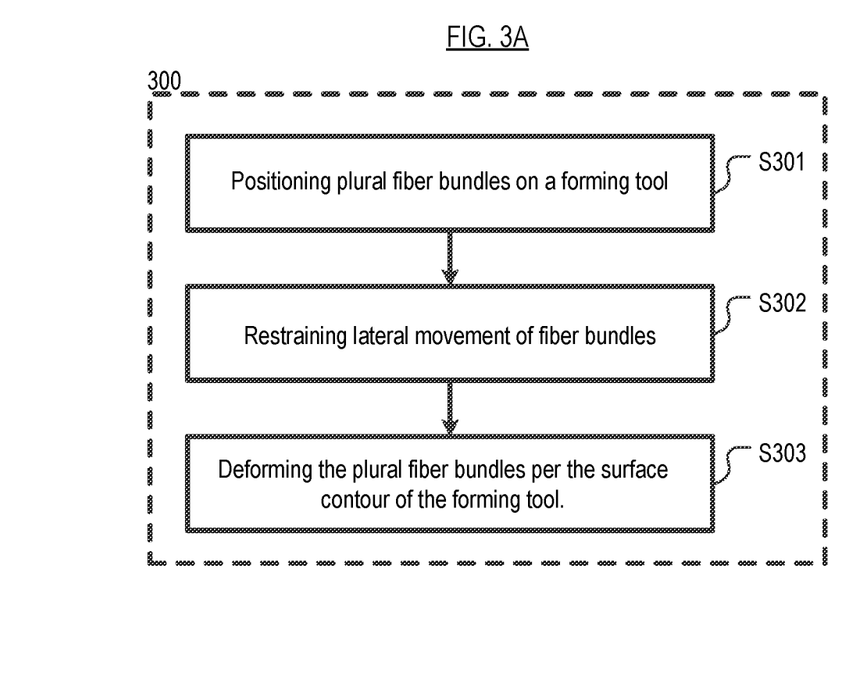
FIG. 3A depicts a method for batchwise production of preforms in accordance with an illustrative embodiment of the invention.
Figure 3B:
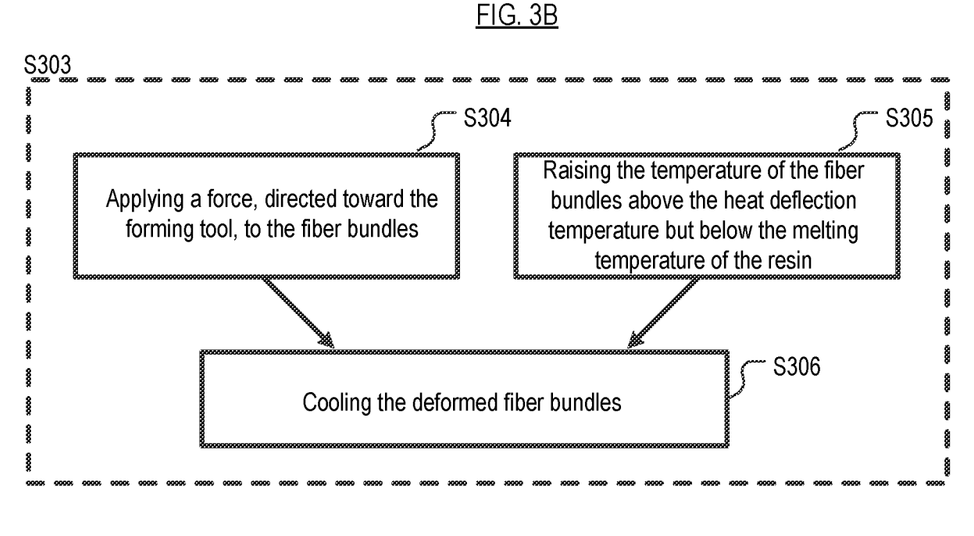
FIG. 3B depicts additional details of the method of FIG. 3A.
Figure 4:
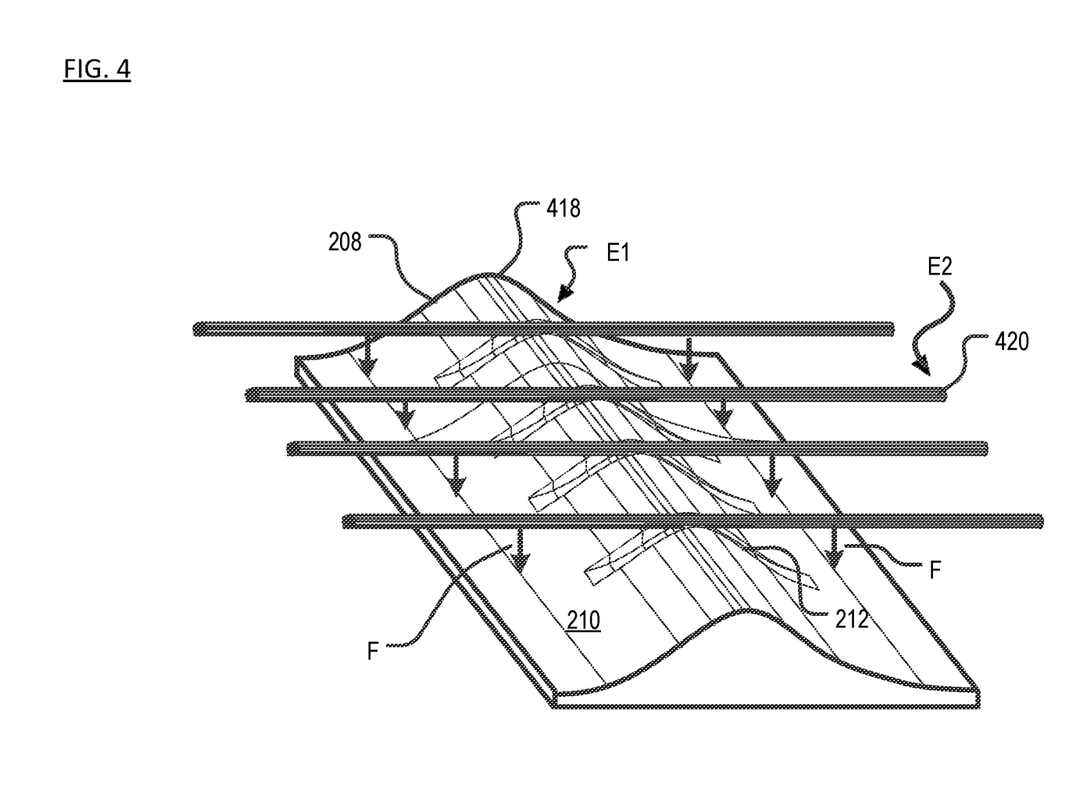
FIG. 4 depicts fiber bundles positioned on a forming tool of the forming unit of FIG. 2, in accordance with the method of FIG. 3A.
Figure 5:
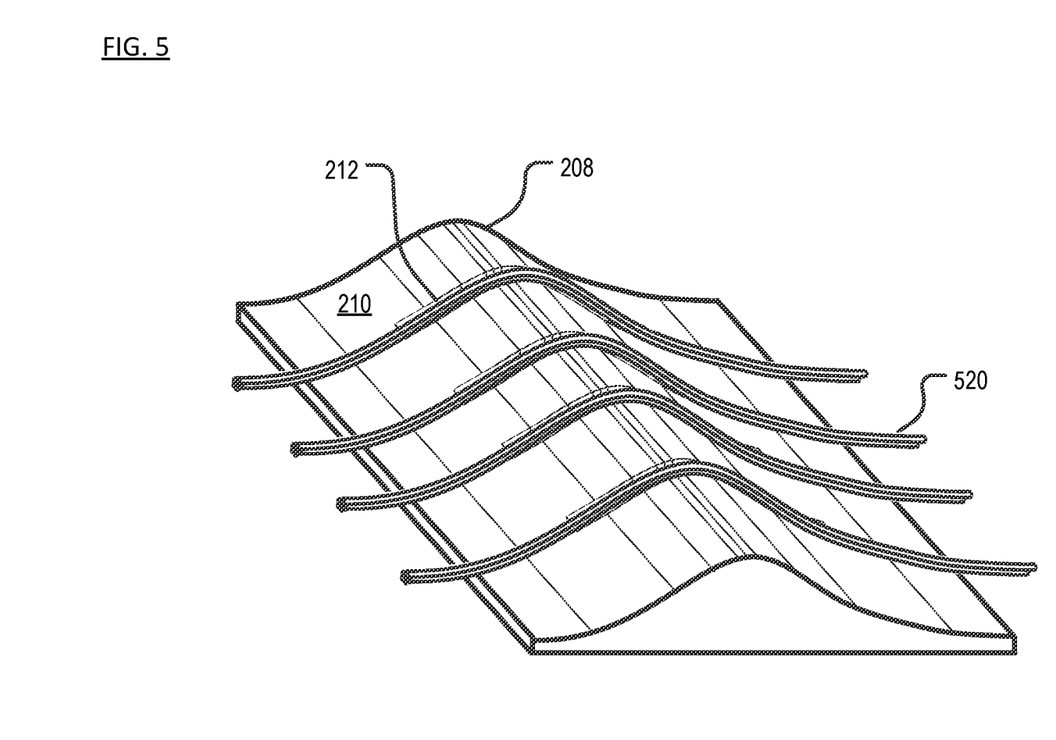
FIG. 5 depicts preforms resulting from the application of the method of FIG. 3A to the fiber bundles of FIG. 4.

FIG. 3A depict method 300 for batchwise production of preforms in accordance with the illustrative embodiment. FIG. 3B depicts additional operations of the method of FIG. 3A. FIGS. 4 and 5 illustrate method 300.

In accordance with operation 301 of method 300, plural runs of towpreg (either continuous or segments as a function of processing specifics) are positioned on the surface of the forming tool. In some embodiments, just a portion of the towpreg is initially in contact with the surface of the forming surface, as a function of the surface contour thereof. In other words, the surface may not be flat. For example, in the illustrative embodiment, the surface is curved.

Per operation 302 of method 300, lateral motion of the fiber bundles is restained/constrained, such as via the guides present at the surface of the forming tool. FIG. 4 depicts four towpreg segments 420 positioned on forming tool 208 in channels 212 (the guides) near peak 418, which is the location on surface 210 at which segments 420 will bend.

In operation S303, the plural fiber bundles are simultaneously deformed, conforming to the surface profile of the forming tool. Sub-operations of operation S303 are depicted in FIG. 3B. Those sub-operations include S304: applying a force, directed toward the forming tool, to the fiber bundles; S305: raising the temperature of the resin in the fiber bundles above the heat deflection temperature of the resin; and S306: cooling the deformed fiber bundles. As disclosed further below, operations S304 and S306 are optionally in the sense that they may be performed passively.

In the embodiment depicted in FIG. 4, the gravitational force serves as force F for deforming towpreg segments 420, urging them towards surface 210 of forming tool 208.

The direction in which force F is applied to the segments of towpreg is not necessarily as shown in FIG. 4. In the embodiment of FIG. 4, gravitation is relied on for the force that deforms the fiber bundles. The gravitational force (as experienced on Earth) is directed toward the center of the Earth. In some other embodiments described later in this specification, mechanical and/or pneumatic forces are used (in conjunction with ever-present gravity) to deform the towpreg. Those forces are appropriately directed to cause the fiber bundles to conform to the contour of surface 210 forming tool 208. For example, in some embodiments, force F, as applied, is directed orthogonally (to the extent possible) to at least a portion of the surface of forming tool 208. In some embodiments, the direction of applied force F is continually adjusted as a function of the surface contour of tool 208, with the intent keeping the direction of the applied force F orthogonal as possible to surface 210 of the tool. As described in further detail later in this specification, such embodiments involve moving one or both of source of force 106 and forming tool 208.

As noted, in operation S305, the temperature of the resin in the fiber bundles on forming tool 208 is raised above its heat deflection temperature (but below the point at which it losses loading bearing capacity), by adding energy (see, e.g., FIG. 4, "E1" and "E2") to the fiber bundles. Energy is applied in conductive, convective, and/or radiative fashion.

Energy is either directly or indirectly applied to the fibers bundles. For example, forming tool 208 can be directly heated, depicted as energy "E1" in FIG. 4, such as via resistance (electrical) heating, a laser, maser, radiant heating, etc. Alternatively, the laser, maser, radiant source can be directed toward the fiber bundles, indicated as "E2" in FIG. 4. In some embodiments, energy from source 216 is directed to forming tool 208 as well as fiber bundles 420.

A sufficient amount of energy is supplied to raise the temperature of the resin in the fiber bundles 420 to above its heat deflection temperature. When that temperature, which is typically in the range of about 40° C. to about 350° C. as a function of the resin system being used, is reached, the resin becomes formable.

As depicted in FIG. 5, the deformed fiber bundles adopt the contour of surface 210 of forming tool 208, resulting in preforms 520. Per operation S306, the preforms are then cooled so that the temperature of the resin falls to below the heat deflection temperature of the resin. Cooling can be active (e.g., blowing cold air over the preforms and forming tool 208, etc.), or passive (i.e., cessation of applied energy). Once cooled to below the heat deformation temperature, preforms 520 maintain their newly acquired shape.

It is to be understood that, with respect to one another, the order of operations S304 and S305 (application of force and application of energy) is not, for at least most embodiments, significant. That is, in addition to indicated order, operation S305 can be conducted before operation S304 (as far as the active application force is concerned), or these operations could be conducted simultaneously. Effectively, they are conducted simultaneously, since the process requires sufficient force and a temperature at or slightly in excess of the heat deflection temperature. Furthermore, in some embodiments, a single source provides both the force (for deformation) as well as energy (for heating). For example, a sufficient flow of appropriately directed (very) hot fluid (e.g., air, nitrogen, etc.) can be used as a single deformation/energy source.

Method 300 can be implemented with one of three "tool states:" (i) a static tool process; (ii) a dynamic tool process; or (iii) a combination static and dynamic tool process.

As a static tool process, forming tool 208 is maintained in a fixed orientation during processing. The fiber bundles are urged against surface 210 of the forming tool via gravitational, pneumatic, or mechanical forces, or any combination thereof. The forces are applied such that their orientation (direction) relative to the fiber bundles is appropriate to adequately conform the bundles the surface contour of forming tool 208.

As a dynamic tool process, forming tool 208 changes its orientation during processing. In some embodiments, forming tool 208 is movable in an orthogonal motion space (i.e., along x, y, and z axes) by an articulating arm with multiple degrees of freedom. In some other embodiments, forming tool 208 is movable in a rotational motion space, e.g., via a mandrel with a single degree of freedom.

To increase the degrees of freedom of movement, in some embodiments, the forming tool is movable in orthogonal motion space as well as rotational motion space. This can be accomplished, for example, by have a mandrel attached to the end of an articulating arm.

The dynamic-tool implementations of method 300 enable forming tool 208 to change orientation at any point to facilitate the displacement of the fiber bundles 420 from an initial shape into the final desired shape in accordance with the surface contour of forming tool 208. This enables fiber bundles to be guided into channels (such as channels 212) or around pins, which are motions that would otherwise be difficult or impossible to achieve in conjunction with a static tool. To achieve such complex motions, the dynamic orientation of the forming tool works in tandem with the application of gravitational, pneumatic, and mechanical forces to position the fiber bundles properly.

As noted above, in some implementations, method 300 can be a combined static and dynamic tool process. For example, the runs of towpreg can be brought into a relatively less complex, simple shape on a static tool. At this point, the preform is nascent; that is, it is not in final form. Subsequently, regions of this nascent preform can be formed against a dynamic tool, thereby creating more complex geometry where desired. As dynamic processes are generally more expensive to implement than static ones, combining the processes as described above can create complex shapes, as appropriate, more cheaply than purely dynamic processes.

The application of force in each of the aforementioned tooling implementations has been generally categorized as (a) gravitational, (b) mechanical, and (c) pneumatic, or a combination thereof, to assist the creation of preforms.

For gravitational-force applications, the downward force of gravity simply urges the fiber bundles straight down along the tool contour. The downward path of motion is constant for a static tool, but can vary with a dynamic tool.

Figure 6:
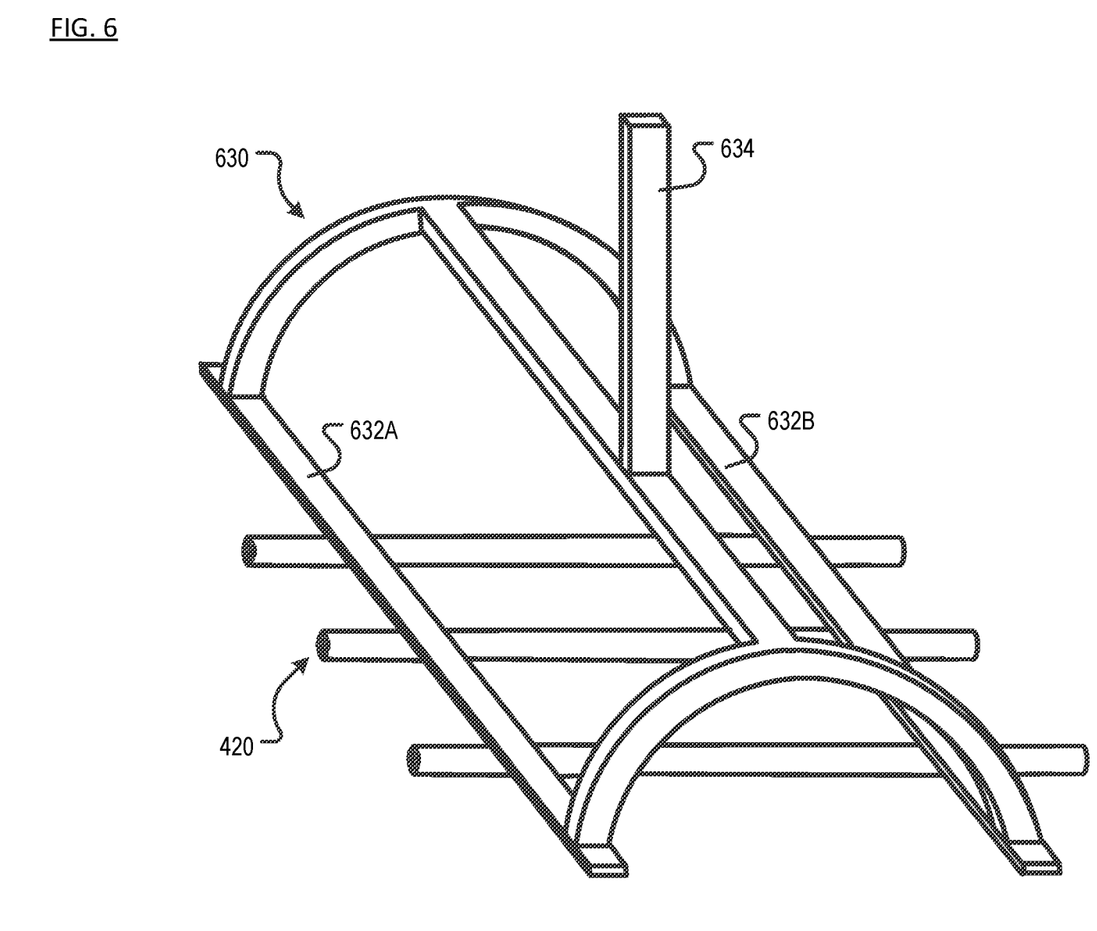
FIG. 6 depicts an embodiment of a tool for use in conjunction with forming unit of FIG. 2.

The application of mechanical-force can be implemented in many different ways. For example, bars can be used to apply force to the fiber bundles, an example of which is implemented as tool 630, which is depicted in FIG. 6. Tool 630 includes two spaced-apart bars or arms 632A and 632B that are moved into contact fiber bundles 420, which have already been placed on a forming tool (not depicted for clarity). Member 634 couples to an arm (not depicted) that moves tool 630. The arm may be articulated to provide multiple degrees of freedom of movement. As tool 630 is moved downward, force is applied to fiber bundles 420 via arms 632A and 632B.

In some other embodiments, a row of hooks attached to a common armature can grab each individual fiber bundle, wherein movement of the armature moves all bundles at the same time in a single motion. Alternatively, a comb-like tool could move all fiber bundles at once, wherein each comb pin applies force to a single bundle.

In a further embodiment, which mates dynamic tooling with the application of a mechanical force, a mandrel that couples to the forming tool is accelerated, thereby applying a centripetal force that urges the fiber bundles to the shape of the tool. In any such mechanism design, mechanical force is applied to the fiber bundles by a customized end-effector or tool, whether via hooks, combs, bars, etc. The implementation of such a tool is within the capabilities of those skilled in art, in conjunction with this specification.

Pneumatic-force application is provided, for example, by compressed air that is delivered through an appropriately designed nozzle. The outlet of the nozzle can be configured to apply force to a single fiber bundle, or, alternatively, be configured to apply force to plural fiber bundles at once. For example, in the former situation, the nozzle outlet can be a small opening, whereas in the latter case, the nozzle outlet have an extended oblong shape or an elongated rectangular shape. In some other embodiments, the "nozzle" could be in the form of a sheet, similar to vacuum forming or bladder molding.

Figure 7:
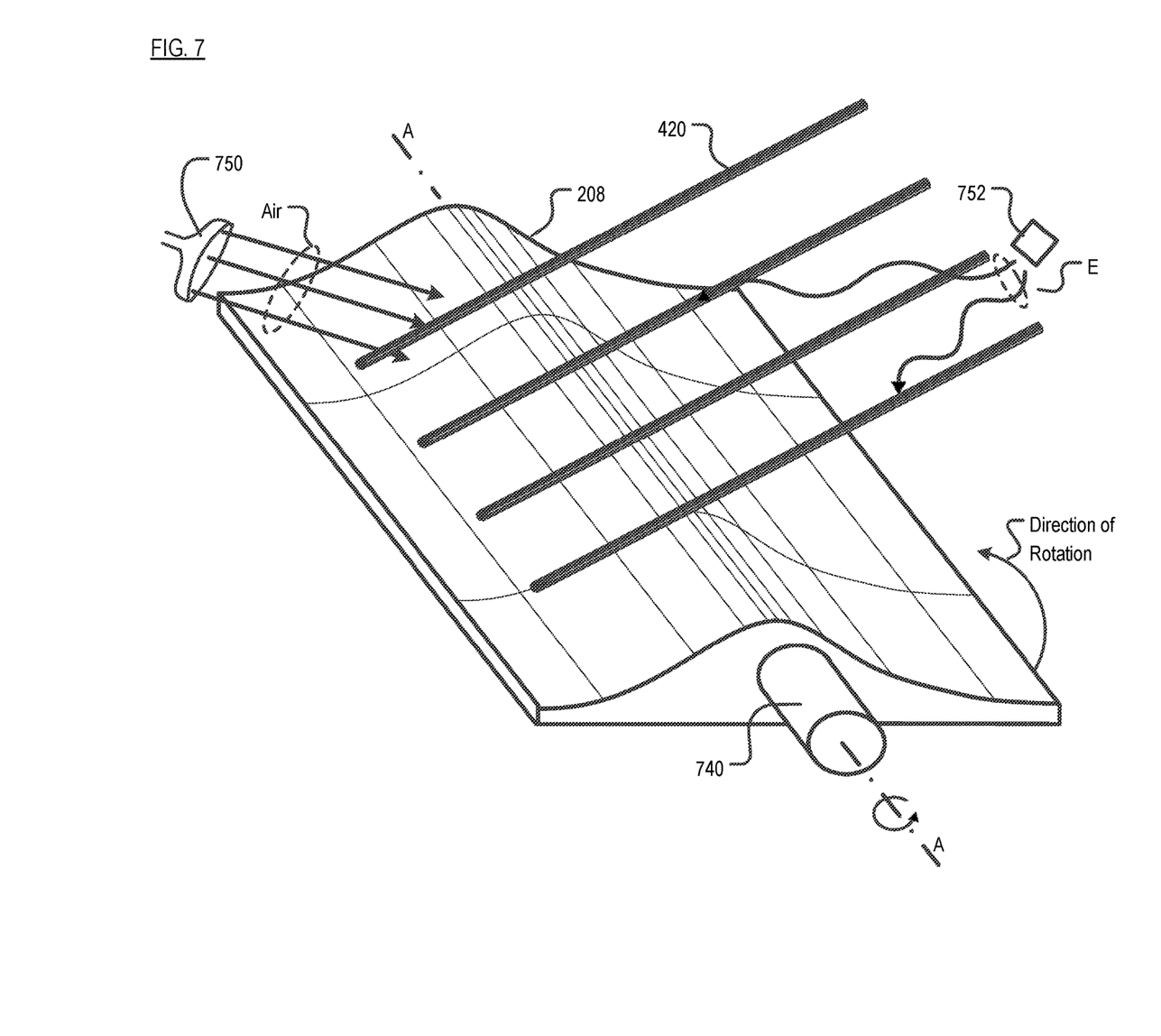
FIG. 7 depicts an alternative embodiment in accordance with the invention.

FIG. 7 depicts an example of dynamic process in conjunction with pneumatic force application. Nozzle 750 directs compressed air towards forming tool 208 (channels 212 not depicted). Mandrel 740, which is coupled to a drive system, is capable of rotating forming tool 208 about axis A-A in the direction indicated. Doing so ensures that substantially the full length of each fiber bundle 420 is exposed to the compressed air issuing from nozzle 750. Radiant energy E is directed toward fiber bundles 310 from source 752, which provides supplemental heating, in additional to convective heating (enclosure not depicted) or, for example, conductive heating through tool 208.

With the tool states and force applications specified, consideration must be given to the heating and cooling of the fiber bundles. For context, the individual fibers within the bundles are fully surrounded by a thermoplastic resin to unite them into a cohesive unit (i.e., towpreg). As previously disclosed, to transition the fiber bundles from their straight, initial state to the shaped, final state (preforms), the resin must be heated to at least slightly above its corresponding heat deflection temperature. In doing so, the resin softens but does not melt, enabling it to be shaped and formed as desired, while at the same time maintaining the unity of the constituent fibers.

In some embodiments, the forming tool and fiber bundles are enclosed in a sealed cavity, such as formed by housing 206 (FIG. 2). The temperature within the cavity is raised, as previously discussed, to a temperature somewhat above the heat deflection temperature of the thermoplastic resin, but below the point at which it loses load-bearing capacity. Once the resin temperature within the fiber bundles rises, via convective heat transfer, to ambient cavity temperature (the heat deflection temperature), the resin becomes formable, and the bundles will begin deforming under the application of force. The fiber bundles deflect via the applied forces until they contact the surface of the forming tool, ultimately taking the shape of the surface of the tool. In some embodiments, the tool functions as a heat sink, effectively cooling the fiber bundles back below their heat deflection temperature (operation S306). After all tows have deflected and taken the shape of the forming tool, heat is removed from the cavity and the shaped tows are taken off the tool. The resultant batch of tows has now cooled and solidified into the desired preform shape.

In some other embodiments, the fiber bundles situated on the forming tool are heated to a temperature above the resin's heat deflection temperature via thermal conduction via the forming tool. That is, rather than receiving heat via convective transfer, heat is conducted to the fiber bundles by heating the forming tool itself. In addition to possessing internal heating components, in some embodiments, the forming tool has internal cooling components to speed the process of heat removal from the bundles once they have been appropriately shaped. As previously noted, heating can also proceed via radiative processes, but this would typically take the form of targeted supplementation, such as directing a laser or maser onto the fiber bundles to supplement the conductive or convective approaches.

Given a forming tool of appropriate size and heat-transfer capacity, methods in accordance with the present teachings can process an exceedingly large number of fiber bundles into preforms in a single cycle. By incorporating various fixtures and features, a forming tool can be customized to accommodate a wide array of fiber-bundle shapes and sizes.

In summary, the tool state used in the present methods can be static, dynamic, or a combination of both. Each such tool state is compatible with gravitational, pneumatic, and/or mechanical force application, or combinations of two or more thereof. Heating is performed via radiative, convective, or conductive processes, or combinations thereof.

It is to be understood that the disclosure describes a few embodiments and that many variations of the invention can easily be devised by those skilled in the art after reading this disclosure and that the scope of the present invention is to be determined by the following claims.

What is claimed:

1. A method for simultaneously forming a plurality of preforms, the method comprising:
positioning a plurality of resin-impregnated fiber bundles on a surface of a forming tool, each fiber bundle having a length, wherein a first portion of the length, but not a second portion of the length of each fiber bundle is in contact with the surface of the forming tool, and wherein the first portion of each fiber bundle is physically separated from neighboring fiber bundles;
restraining lateral movement of each first portion towards neighboring first portions; and
deforming the plurality of fiber bundles wherein the second portion of each fiber bundle contacts the surface of forming tool, conforming to a contour of the surface of the forming tool, thereby forming a plurality of preforms.

2. The method of claim 1 wherein deforming the plurality of fiber bundles comprises raising a temperature of the fiber bundles to a temperature that is above a heat deflection temperature and below a melting temperature of the resin in the fiber bundles.

3. The method of claim 2 wherein raising a temperature of the fiber bundles comprises providing energy to the forming tool, wherein the applied energy heats the forming tool and the fiber bundles.

4. The method of claim 2 wherein raising a temperature of the fiber bundles comprises applying energy directly to the fiber bundles.

5. The method of claim 2 comprising lowering the temperature of the plurality fiber bundles to below the heat deflection temperature after the plurality of fiber bundles have conformed to the contour of the surface of the forming tool.

6. The method of claim 2 wherein deforming the plurality of fiber bundles comprises applying a force to the fiber bundles, wherein the force is directed towards the forming tool.

7. The method of claim 2 wherein deforming the plurality of fiber bundles comprises changing an orientation of the forming tool in orthogonal motion space, such as along x, y, and z axes.

8. The method of claim 7 wherein deforming the plurality of fiber bundles comprises changing an orientation of the forming tool in rotational motion space.

9. The method of claim 2 wherein deforming the plurality of fiber bundles comprises changing an orientation of the forming tool in rotational motion space.

10. The method of claim 6 wherein deforming the plurality of fiber bundles comprises:
changing an orientation of the forming tool; and
changing a direction in which the force is applied in response to changes in the orientation of the forming tool.

11. The method of claim 2 comprising cooling the deformed fiber bundles.

12. The method of claim 1 wherein restraining lateral motion of the fiber bundles comprises providing a plurality of spaced-apart guides at the surface of the forming tool.

13. A method for simultaneously forming a plurality of preforms, the method comprising:
positioning a plurality of resin-impregnated fiber bundles on a surface of a forming tool, wherein each fiber bundle is physically separated from neighboring fiber bundles;
restraining lateral movement of each fiber bundle towards neighboring fiber bundles;
deforming the plurality of fiber bundles in accordance with a surface geometry of the forming tool, deformation being due, at least in part, to raising a temperature of the fiber bundles above a heat deflection temperature of the resin and below the melting temperature of the resin; and
cooling the deformed fiber bundles, thereby forming a plurality of preforms.

14. The method of claim 13 wherein deforming the plurality of fiber bundles comprises applying a force to the fiber bundles, wherein the force is directed towards the surface of the forming tool.

15. The method of claim 1 wherein each preform of the plurality thereof has the same length.

16. The method of claim 13 wherein cooling the deformed fiber bundles comprises actively removing energy therefrom.

17. A system for simultaneously forming a plurality of preforms, the system comprising:
a forming tool, the forming tool having a forming surface that receives a plurality of fiber bundles, the forming surface of the forming tool having a plurality of spaced-apart guides for maintaining the fiber bundles in lateral spaced relation to one another and for maintaining a cross-sectional dimension of each of the fiber bundles; and
a source of energy, wherein the source of energy is configured to apply energy directly to at least one of the forming tool and the plural fiber bundles, the energy ultimately causing, at least in part, the plurality of fiber bundles to deform consistent with a contour of the forming surface of the forming tool.

18. The system of claim 17 further comprising a housing for creating a cavity that contains the forming tool.

19. The system of claim 17 further comprising a source of force, wherein the source of force is configured to apply force to the plural fiber bundles, wherein the force is directed toward the surface of the forming tool.

20. The system of claim 17 wherein the surface of the forming tool is flat.

21. The system of claim 17 wherein the surface of the forming tool is curved.

22. The system of claim 17 further comprising a cooling source, wherein the cooling source removes heat from fiber bundles after the fiber bundles deform.

23. The system of claim 17 wherein the spaced-apart guides comprise channels having cross-sectional dimensions suitable for receiving the fiber bundles and sufficient for restraining lateral movement thereof.

24. The system of claim 23 wherein a width of the channel is at least as wide as a largest cross-sectional dimension of the fiber bundles.

25. The system of claim 23 wherein a depth of the channel is at least as deep as a largest cross-sectional dimension of the fiber bundles.

26. The system of claim 17 wherein the forming tool is operatively coupled to a multi-axis positioner.

27. The system of claim 17 wherein the forming tool is operatively coupled to a mandrel, wherein the mandrel is operative to rotate the forming tool.

* * * * *